(12) United States Patent
Livingston

(10) Patent No.: US 8,308,939 B2
(45) Date of Patent: Nov. 13, 2012

(54) EFFICIENT ARRANGEMENT OF MEMBRANE BIOREACTORS

(75) Inventor: Dennis Livingston, Austin, TX (US)

(73) Assignee: Ovivo Luxembourg S.a.r.l., Munsbach (LU)

( * ) Notice: Subject to any disclaimer, the term of this patent is extended or adjusted under 35 U.S.C. 154(b) by 516 days.

(21) Appl. No.: 12/459,769

(22) Filed: Jul. 6, 2009

(65) Prior Publication Data

US 2011/0000836 A1    Jan. 6, 2011

(51) Int. Cl.
*B01D 33/70* (2006.01)

(52) U.S. Cl. .................. 210/151; 210/194; 210/196

(58) Field of Classification Search .......... 210/194, 210/196, 151
See application file for complete search history.

(56) References Cited

U.S. PATENT DOCUMENTS

| | | | |
|---|---|---|---|
| 5,482,625 A | 1/1996 | Shimizu et al. | |
| 5,651,889 A | 7/1997 | Wataya et al. | |
| 6,712,970 B1 | 3/2004 | Trivedi | |
| 6,743,362 B1 | 6/2004 | Porteous et al. | |
| 7,052,610 B2 | 5/2006 | Janson et al. | |
| 7,387,723 B2 | 6/2008 | Jordan | |
| 7,476,322 B2 | 1/2009 | Dimitriou et al. | |
| 2009/0029434 A1 | 1/2009 | Tsai et al. | |

*Primary Examiner* — Chester Barry
(74) *Attorney, Agent, or Firm* — Thomas M. Freiburger

(57) ABSTRACT

Flat-sheet membrane filter assemblies require open space around equipment to form a viable path for an internal recycle or roll pattern. Creating a dedicated roll pattern for individual filter assemblies is space intensive and imposes process constraints on tank dimensions. A hollow wall or series of pipes forms a recycle wall designed to consolidate roll patterns and reduces space requirements. The recycle wall is designed such that the structural components also serve as a mixed liquor distribution system for the necessary roll pattern. Fixed vertically oriented conduit and sectional channel pieces allow for easy access and removal of membrane filter assemblies installed side by side. Feeding mixed liquor, air and or influent to the bottom of filter assemblies via submerged conduit improves process efficiency when coupled with return channels spaced not more than 10 feet away and above assemblies. The system is particularly advantageous for flat-sheet membrane filter units used in SMBR applications but is adaptable to other technologies including tubular and hollow-fiber membrane filter assemblies.

28 Claims, 18 Drawing Sheets

Tank Volume = 3,350 ft

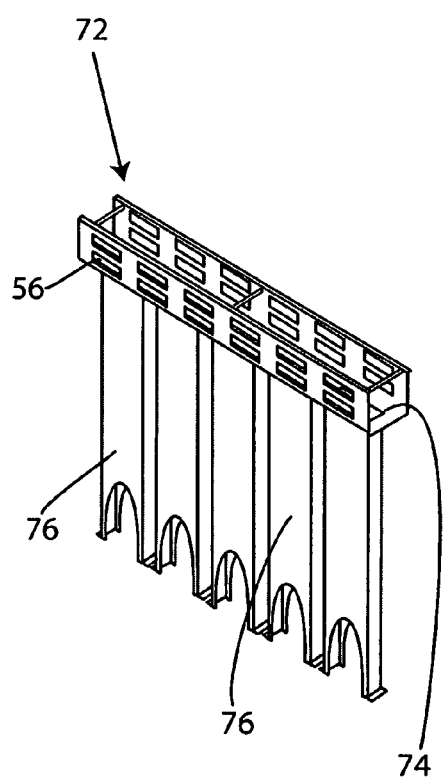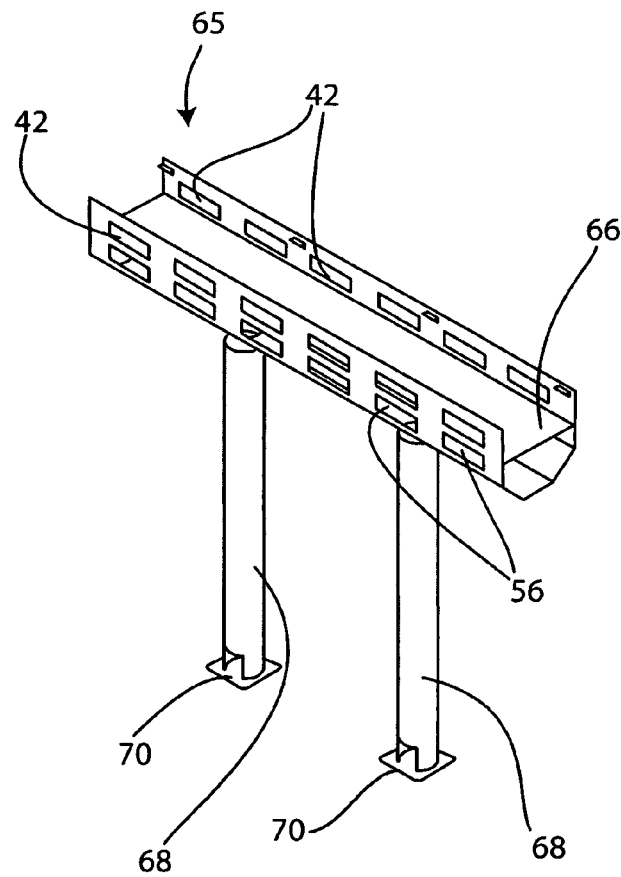
FIG. 10
FIG. 11

US 8,308,939 B2

EFFICIENT ARRANGEMENT OF MEMBRANE BIOREACTORS

BACKGROUND OF THE INVENTION

The invention concerns flat-sheet membrane separators, especially as used in wastewater treatment or biosolids waste management systems. Specifically the invention encompasses an improved, more efficient arrangement of flat-sheet membrane assemblies as process cells in a tank, along with positioning of liquid piping and air conduits for space saving, energy saving and higher efficiency operation.

Flat-sheet membrane technology has some inherent advantages over alternate technologies when used in submerged membrane bioreactor (SMBR) applications. In particular, flat-sheet technologies are generally considered easier to operate and more robust than hollow-fiber or tubular membrane systems. However, flat-sheet technology is generally less space and energy efficient than competing technologies due to low packing density and longer hydraulic residence times (HRT).

Packing density is a measurement of space efficiency and is typically calculated by dividing membrane area by the volume occupied by membrane equipment. There are over 2,000 SMBR systems worldwide using flat-sheet membranes with packing densities on the order of 10-60 $m^2/m^3$. Competing technologies generally report packing densities between 150-300 $m^2/m^3$. Packing density does not necessarily correlate to capacity, as filtration rate can vary significantly among available technologies depending on flux.

Flux is a unit of velocity that equates to the rate at which water can be filtered for a given membrane area. Accounting for differences in flux capabilities and additional installation space requirements (piping, etc.), volumetric space requirements for a given treatment capacity can be calculated in terms of HRT (hydraulic residence time).

HRT is equivalent to the amount of time spent by a unit volume of water in a reactor during treatment and is the best measure of space efficiency. HRT numbers generally range between 1.0 hr to 4.0 hr for flat-sheet technologies and between 0.4 hr to 1.0 hr for hollow fiber systems. There are two main reasons for the high HRT reported for SMBR systems using flat-sheet technology: inefficient structural design (primarily channels, piping and covers) and space requirements necessary for the development of so called roll patterns induced by scour air flow.

The method of piping and air scouring described herein decreases HRT for SMBR systems using any membrane geometry but has the most benefit for flat-sheet technology. HRT can be decreased by 40% or more. In addition, the invention eliminates dimensional constraints on reactor design in terms of length to width aspect ratio, increases energy efficiency and reduces construction cost.

In SMBRs (also referred to as immersed or submerged membrane bioreactors) a combination of mixed liquor (activated sludge and wastewater) and air moving tangentially across the surface of membranes (cross-flow) scours filtered solids from the surface of the membrane. It is this scouring, cleaning action that makes submerged membrane technologies commercially viable.

It is generally accepted that superficial (tangential) velocities of approximately 0.5 ft/s to 1.5 ft/sec are required to promote slug-flow. Slug-flow is a hydrodynamic condition that research suggests promotes the most efficient air scouring in submerged membrane applications. To achieve this kind of velocity, bubbles are introduced at the bottom of membranes arranged in various geometries to create a pumping effect. The rise velocities of bubbles are generally at least 10 times typical mechanical pumping rates and are sufficient to induce the desired slug flow regime. Once the bubbles rise to the water surface, sufficient depth and a viable flow path are necessary to allow the development of a roll pattern where filtered mixed liquor is circulated back down to the diffusers located at the bottom of the tank.

For flat-sheet systems it is common practice for discrete assemblies of membrane equipment (sometimes referred to as membrane units, racks or cassettes) to be supplied with dedicated submerged air diffusers that induce a circular flow pattern around each assembly with an upward velocity on the order of 0.5-1.5 ft/sec (see FIG. 1). In this configuration, the rising two-phase flow (bubbles and mixed liquor) can flow back down the sides of each individual assembly to be re-entrained at the bottom of the assembly and sent back up through the sheets in a circular fashion (called a roll pattern). The roll of combined mixed liquor and air can also be described as an internal recycle (IR) stream. This design practice has been effective for decades but adds cost, increases the overall volume requirements and limits energy reduction options.

Putting empty space between membrane equipment decreases space efficiency but is currently viewed as necessary by purveyors of flat-sheet membrane equipment. The problem (of reduced space efficiency) is further compounded by fluid conveyance requirements, inefficient piping design and the need for reactor covers.

In a SMBR system there are basically three fluids that must be conveyed into and out of reactors: scouring air, filtered water (permeate) and mixed liquor. Common practice is to separate all of these conveyance systems and build them into reactors using dedicated space for access, increasing cost and decreasing packing density. In large plants, concrete walls are generally poured to support piping systems and tank covers. Walls are also necessary to separate membrane equipment into process zones with specific and limited length to width aspect ratios. In addition to concrete walls, concrete channels are built to feed and return mixed liquor from membrane zones (tanks).

In FIG. 2 a diagram of a typical SMBR reactor is shown in plan view. Per the diagram mixed liquor feed and return channels are located on opposite sides (ends) of the tank (one inlet and one outlet). Channels are generally formed from concrete and connected to a reactor (tank volume) by gates or simple wall cutouts. Permeate and air pipes run adjacent to the submerged membrane assemblies and are mounted to the tank walls using brackets or other methods. In many cases the membrane assemblies are stacked two high (also called double-deck configuration) to increase packing density and reduce HRT. However, stacking membrane equipment has several issues including access to lower membrane elements, additional piping, the development of dissolved oxygen gradients from the water surface down to the tank floor and increasing wall thickness to accommodate taller walls (driving up concrete costs and carbon footprint). Moreover, double-deck configurations do not cut air requirements in half as expected. At increased water depths air scouring (volumetric) requirements increase to achieve the same bubble rise rate and the added discharge pressure (given increased water depth) drives up energy requirements to produce a given volume of air.

Air bubbles emitted at or near the bottom of the tank transfer oxygen as they rise to the surface. The filtered (thickened) aerated mixed liquor is subsequently depleted of oxygen as it returns to the diffuser down the side of the membrane assembly, creating an oxygen gradient. Dissolved oxygen (DO) concentration gradients can degrade SMBR performance in two ways. First, without sufficient DO, biological process can be inhibited, impacting effluent quality. Second, in deeper tanks DO can be low enough (near zero) to lead to anaerobic deteriorating sludge quality by allowing the formation of extracellular polymeric substances (EPS), the leading type of organic foulant. Arranging single-deck or double-deck membrane assemblies in rows with a single point of feed and a single outlet can lead to significant concentration gradients that can impact system performance. In FIG. 15, typical numbers are given for MLSS concentration as a function of aspect ratio (length to width). This phenomenon limits the allowable length to width ratio of tanks. The varying concentration of mixed liquor coupled with the changing concentration in pollutants from the tank inlet to outlet points theoretically creates small reactors (one per filter assembly) operating in series and reducing treatment efficiency. Methods have been proposed to prevent this condition, including limiting the length to width ratio (3:1 is typical); using pipes located beneath membrane assemblies to feed and return mixed liquor; using internal pumps to keep tank contents well mixed; or having multiple feed return points in channels. However, none of these methods will completely eliminate thickening gradients, as mixed liquor thickened by membranes adjacent the tank inlet will be filtered again (further thickened) if separated from the tank outlet by another membrane assembly. Also, many methods used to minimize MLSS gradients create a separate problem called short-circuiting whereby pollutants are filtered prematurely before biological processes can take place. Finally, covers are often necessary and mechanical support structures added, taking additional space and increasing cost.

As noted above, current art is space-consuming and inefficient. The objective of the invention is to greatly increase efficiency in SMBR systems and improve performance by eliminating MLSS and DO gradients irrespective of tank aspect ratio.

SUMMARY OF THE INVENTION

In the invention the mixed liquor return channel and multiple internal recycle streams (necessary for creating roll patterns at discrete membrane assemblies) are reoriented and integrated into a common wall or side space that preferably also serves to mechanically support reactor (tank) covers. The mixed liquor feed, scouring air and in some cases raw wastewater are introduced beneath the membrane filter assemblies via one or more pipes to create properly mixed reactors operating in parallel irrespective of tank aspect ratio. By configuring the feed and return points to promote single pass filtration (not multiple thickening steps) and configuring membrane assemblies into defined process cells, MLSS/DO gradients and short-circuiting can be virtually eliminated. These process cells can then be arrayed into any area regardless of aspect ratio; that is, the tank space for the process cells can be very long if desired.

To create distinct process cells that operate in parallel, each membrane assembly should be a fixed distance from a return point, allowing filtered mixed liquor immediately to leave the reactor. In the invention a compartmentalized recycle wall is located above and adjacent to membrane assemblies and feed is introduced below and adjacent to each membrane assembly via a perforated pipe or other conduit.

Allowing a multitude of entry (feed) and return (outlet) points has the significant benefit of forming well-defined continuous stirred tank reactors (CSTR) designed to prevent short-circuiting and the formation of MLSS/DO concentration gradients.

In conventional treatment step feed or step return applies to systems that have multiple points at which both occur. However, such prior art generally refers to limited, discrete points usually identified as gates, wall cutouts, valves or other. In the invention, IR and return mixed liquor are both picked up at an essentially infinite number of points using slots, grooves, perforations or other openings molded or cut into what is hereafter referred to as an integrated recycle wall or space or compartment.

Instead of spacing membrane equipment to accommodate the needed conventional roll pattern, submerged membrane assemblies are pushed tightly together and a roll pattern is created through a common recycle wall using pipes, baffles or vanes. The recycle wall can be further compartmentalized to separate return flows from the IR needed for generating roll patters. By separating the two flows, tank levels can be adjusted without impacting roll patterns and draw off for return can be equalized along a reactor's full length despite numerous hydraulic jumps and vortexing that may occur with downward IR flow. This new arrangement can reduce volumetric space requirements by about 40% (compared to double-stacked prior arrangements).

Integrating the IR and return streams by running one or more long channels down the length of the reactor improves flow distribution and can eliminate so called short circuiting and/or mixed liquor concentration gradients. Using a single point of feed and return of even applying multiple points of feed and return at the wrong locations may allow dissolved pollutants to bypass treatment (prematurely filtered). In theory, all dissolved species are immediately and equally distributed amongst the reactor volume upon entry, but practically this is not the case. Similarly, mixed liquor fed into one end of a long reactor with many membrane units will thicken as it moves from the entry point to the exit point. In some cases, mixed liquor concentrations can vary by a factor of 5-10 times from the entry point to the exit point, further compounding short-circuiting issues and diminishing treatment efficiency (degraded filtrate quality).

In the invention two variations are described where IR and return mixed liquor are joined (co-mingled), or separated by a plate. Adding a separating plate creates two separate compartments in the same area (wall space). The bottom of the IR zone could be open, slotted, configured with baffles or connected to pipes or downspouts that direct the IR to the bottom of the tank. All of these devices are to condition flow and direct it back toward the bottom of the membrane assemblies. Support pipes or wall supports in the recycle wall can be multipurpose, supporting the tank covers, recycle wall and the collection through from which IR is distributed to the bottom of the membrane assemblies at the bottom of the reactor tank.

Integrating the mixed liquor return and IR into one structure can eliminate the need for additional concrete walls. Less concrete can reduce costs, minimize carbon footprint and improve on installation times. The combined recycle wall structure can also be used to support tank covers. In package systems where submerged membrane assemblies are installed in tanks, the recycle wall can serve as structural support, improving the structural integrity of the tank and reducing seismic bracing requirements.

It is among the objects of the invention to put submerged membrane assemblies, especially flat-sheet membrane assemblies, in a compact, space-saving arrangement that leads to better process efficiency wherein mixed liquor feed, scouring air and in some cases influent wastewater are co-mingled and introduced beneath membrane filter assemblies with return mixed liquor and IR being collected through a common channel above the membrane filter assemblies serving multiple purposes including the support of tank covers. These and other objects, advantages and features of the invention will be apparent from the following description of a preferred embodiment, considered along with the accompanying drawings.

DESCRIPTION OF THE DRAWINGS

FIG. 10 is a schematic perspective view showing a trough and pipe structure to serve the purpose of sludge recycle and also as a structural support.

FIG. 11 is another schematic view in perspective, showing an alternative to FIG. 10.

DESCRIPTION OF PREFERRED EMBODIMENTS

Figures 3A, 3B:
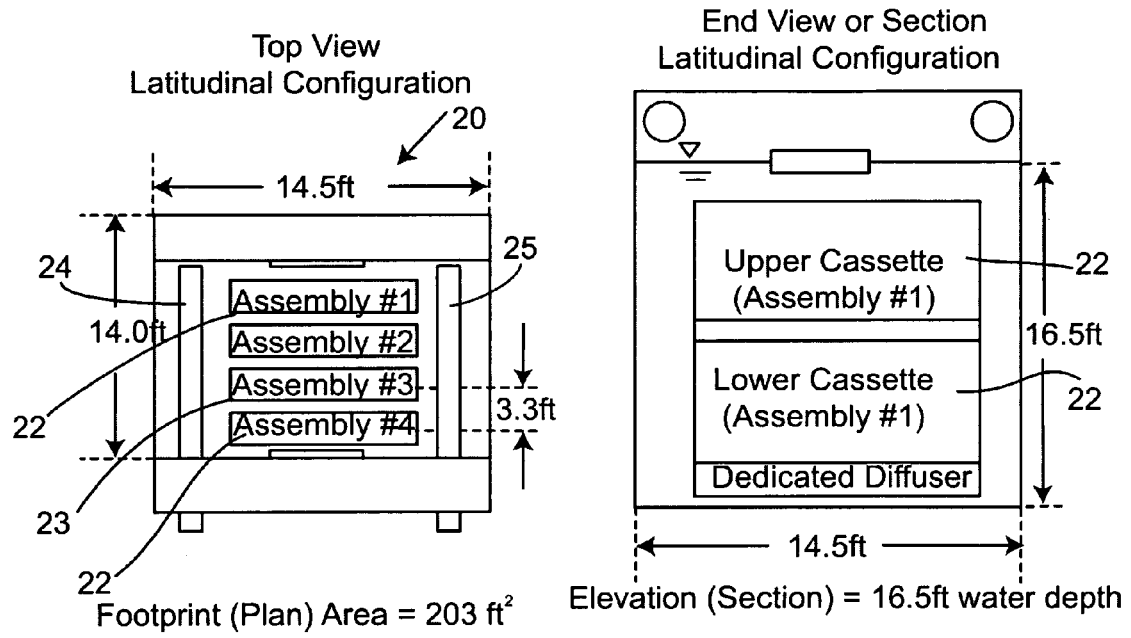
FIGS. 3A and 3B show a prior art arrangement of membrane filtration units in a reactor tank.

FIGS. 3A through 3F are further schematic diagrams for comparison of space requirements for membrane filtration units, here cassette type units, in accordance with prior art and in accordance with the invention. In FIGS. 3A and 3B eight cassettes are maintained in an MBR tank or zone 20, each cassette being shown at 22. These cassettes are stacked in a typical way, four lower cassettes, four upper cassettes. The cassettes are arranged with space between them, as at 23, to allow the typical roll pattern of internal recycle as discussed above. The double stacking of the cassettes requires a deep tank, shown here with a liquid level of about 16.5 feet. In this typical example scouring air is delivered to the zone through an air pipe 24 and a permeate pipe for permeate water is shown at 25, these two pipes being at opposite sides of the array or series of cassettes (positioned generally off the ends and above the individual cassettes 22). As is typical, the cassettes are spaced at about 3.3 feet center to center. The footprint for the assembly, as shown in the plan view of FIG. 3A, is about 203 square feet for this typical prior art example. The tank volume for this typical arrangement is about 3350 cubic feet.

Figure 3C:
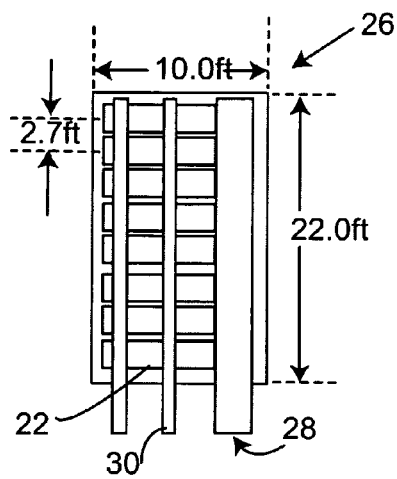
FIGS. 3C and 3D are plan and transverse section views showing an example of volumetric space savings using an arrangement pursuant to the invention.
Figure 3D:
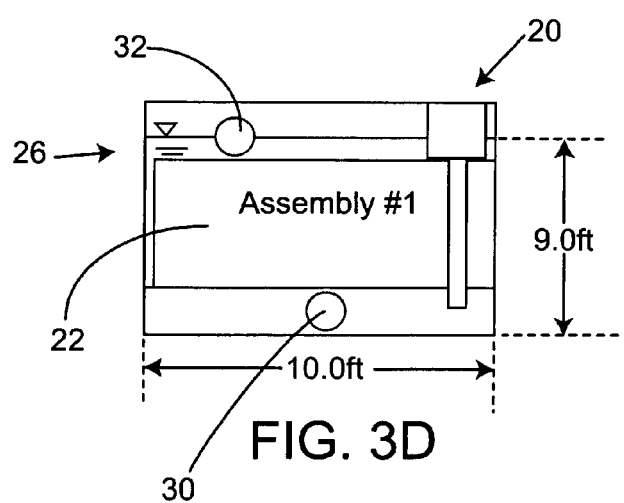

FIGS. 3C and 3D show a tank or zone 26 with a series of cassettes 22 arranged in a manner pursuant to the invention. Here, the cassettes are in lateral configuration in the tank as shown in the plan view of FIG. 3C. FIG. 3D shows one of the cassettes in side view, in this schematic elevational section. In this arrangement of the invention, the cassettes 22 are much closer together and can be, for example, about 2.7 feet center to center of the side by side cassettes. The tank here is about 10 feet wide and 22 feet long, for a footprint of 220 square feet for eight cassettes. This is slightly more than the footprint for the eight cassettes in FIGS. 3A-3B, but the eight cassettes are not double stacked, as revealed in FIG. 3D. FIGS. 3C and 3D also show that the piping and internal recycle are arranged very differently with the MBR system of the invention. At the right side as viewed in these schematic drawings is a recycle wall or recycle area or compartment 28 through which internal recycle for all cassettes 22 takes place, with an IR progression from above the cassettes and down through the recycle wall or compartment 28 and back to below the cassettes to again rise through the cassettes under the influence of rising air bubbles. Infeed of MLSS (or influent wastewater, or for scour air, or both) is through a perforated pipe indicated at 30, and permeate from the membranes is withdrawn through a permeate pipe 32 shown above the membranes. The footprint of the tank 26 in this example is 220 square feet, and the volume, for a nine foot tank depth, is 1980 cubic feet. This represents approximately 40% saving in tank volume for eight membrane filtration units, more specifically about 41% with the particular dimensions shown.

Figure 3E:
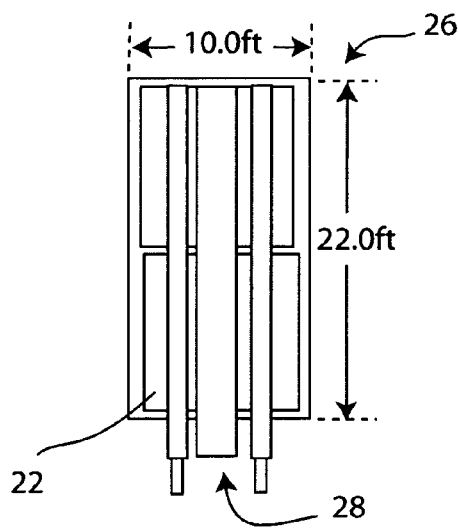
FIGS. 3E and 3F show an alternate arrangement pursuant to the invention.
Figure 3F:
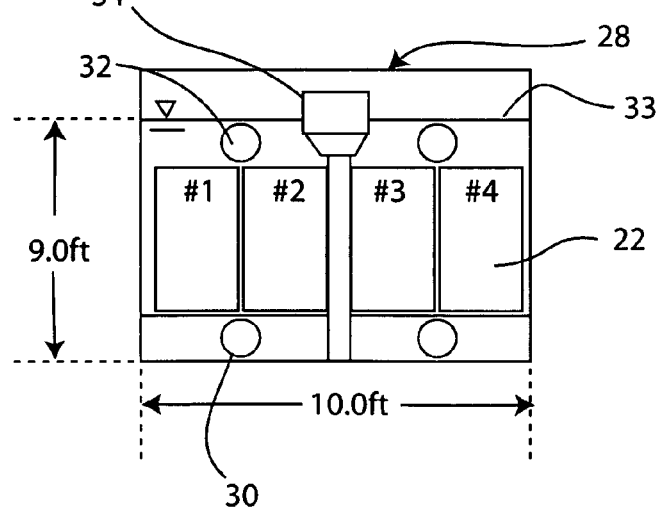

FIGS. 3E and 3F show a more preferred arrangement wherein the cassettes 22 are arranged in pairs but aligned in tandem or longitudinal configuration and these schematic drawings are intended to illustrate volume reduction due to the internal recycle and cassette arrangement of the invention, and this layout as well as that of FIGS. 3C and 3D is illustrated in better detail below. Here, a recycle wall, compartment or space 28 is positioned generally centrally in the process cell or zone 26 having eight cassettes or membrane filtration units 22. FIG. 3F shows that there are pairs of cassettes or units 22 on both sides of the central recycle compartment 28. A pipe 30 for infeed or aeration (or both) is shown below each pair of cassettes 22 as viewed in FIG. 3F, and a permeate pipe 32 is shown above the pairs of cassettes. FIG. 3E shows there are two pairs of cassettes on each side of the central recycle wall, the two pairs being in tandem. This is an example of a cell which can be a part of a much larger MBR system, with many cells in tandem as well as in rows, as explained further below. FIG. 3F shows a liquid level at 33. Both return MLSS and internal recycle (IR) flow into a trough structure 34 between the two sides of the recycle compartment, and this is discussed further below. With the invention, instead of spacing membrane equipment to accommodate the needed roll pattern for internal recycle, membrane assemblies or cassettes 22 are pushed together and a roll pattern is created through the recycle wall 28 using pipes or walls or a dedicated space descending generally vertically (as seen in other figures) or using flow conditioning devices such as baffles or perforations. For example, the cassettes 22 can be at about 2.7 feet spacing center-to-center as shown in FIGS. 3A-3D in side-by-side relationship, or a range of about 2.5 feet to 3.0 feet. Clear space between cassettes can be from zero (virtually touching) to about two or three inches. The recycle wall 28 may also carry some of the fluid services (e.g. air in, permeate water out) if desired.

For the IR (internal recycle) and RAS or return (flow exiting the MBR), the channel 34 can be a long trough that runs down the length of the reactor (which could be much longer in length than the example schematically shown). This improves flow distribution and can eliminate equipment necessary to conventional plants.

Figure 1:
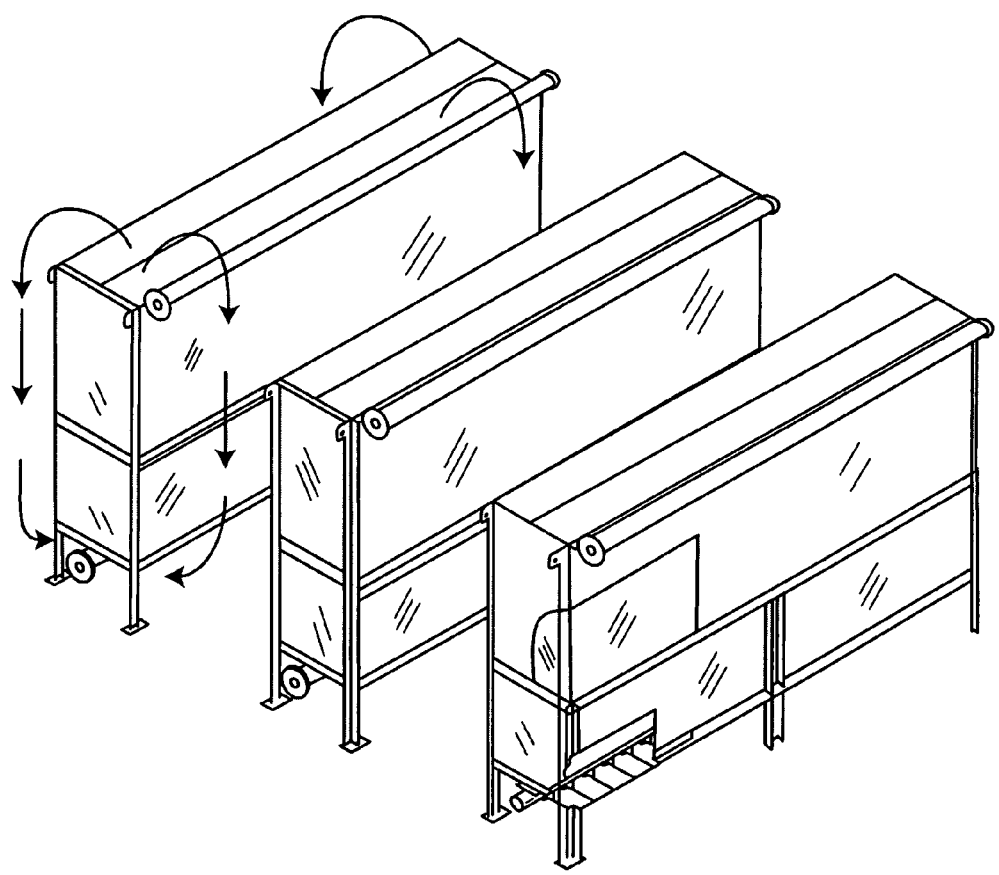
FIG. 1 is a schematic perspective view demonstrating a unique circular roll pattern (IR) for each assembly in activated sludge according to prior practice.
Figure 2:
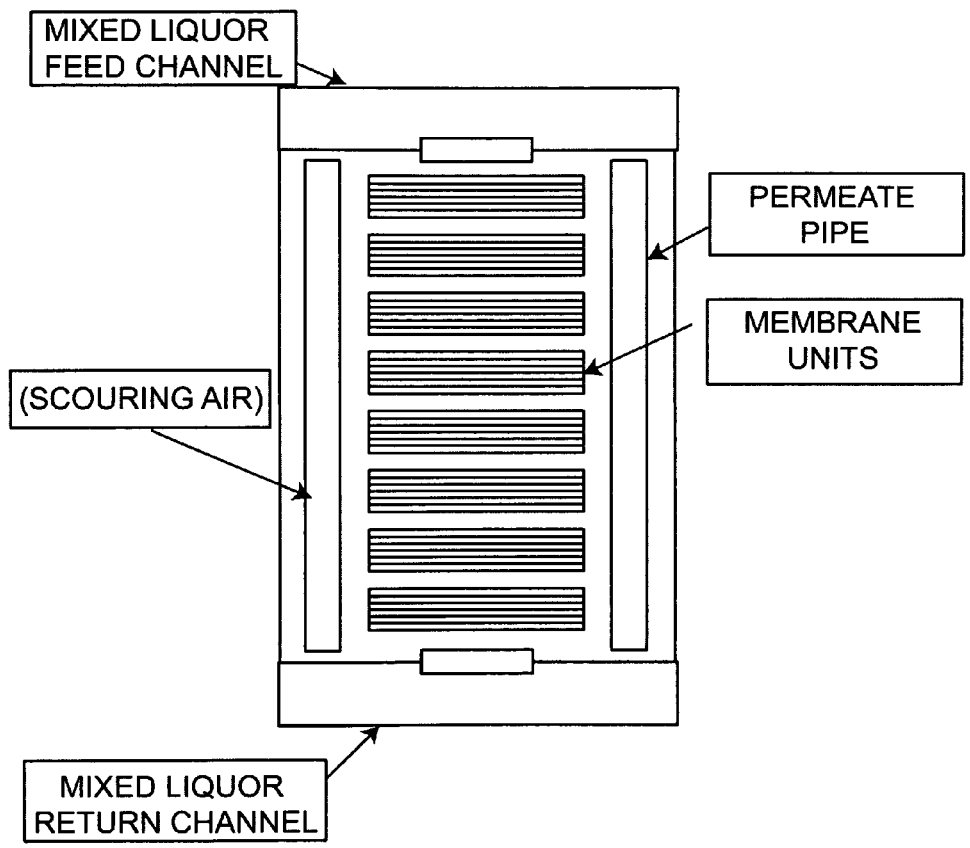
FIG. 2 is a schematic plan view showing an SMBR reactor or tank in accordance with prior art.
Figure 4:
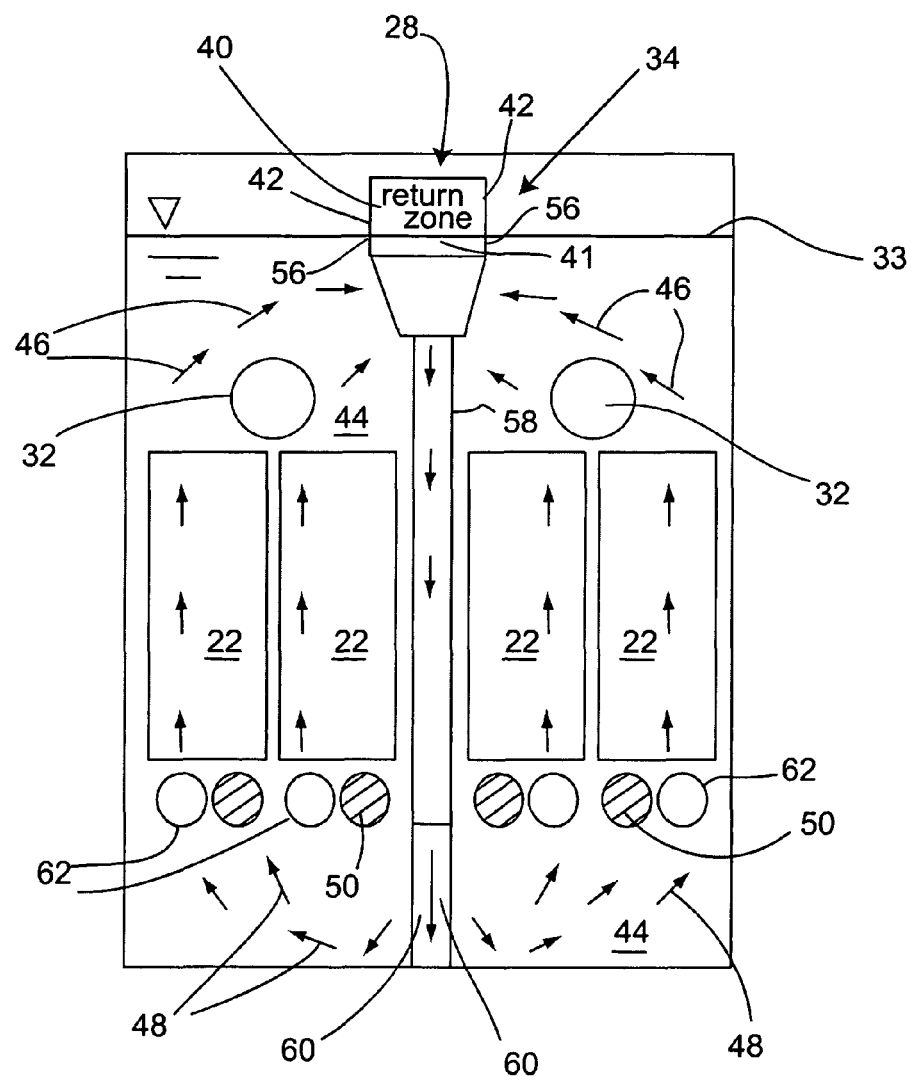
FIG. 4 is a schematic elevation view in cross section, showing details of the MBR arrangement shown in FIGS. 3E and 3F.

FIG. 4 is a schematic view in transverse section showing essentially the MBR arrangement of FIGS. 3E and 3F. Here, the recycle wall or compartment 28 is shown between pairs of cassettes 22 arranged longitudinally. The cassettes of a pair can be virtually touching (or about one to three inches apart). In this configuration the actual flat-sheet membranes are parallel to the plane of the cassette's side seen in FIG. 4. The liquid surface of the mixed liquor is shown at 33, with the membrane assemblies cassettes or units) submerged within the liquid. A return zone or overflow area is indicated at 40, as part of the trough structure 34, with an open side 42 facing the mixed liquor in the tank volume 44 at each side of the recycle wall 28. The internal recycle (IR) of the activated sludge within the tank volume 44 is indicated by arrows 46 and 48. As the diagram indicates, the close spacing of the cassettes 22 with each other and within the confines of the tank leaves little space to either left or right. As reviewed above, the IR is caused by the upward flow of scour air, which can be provided by a series of submerged air diffusers or bubblers such as indicated by pipes at 50 in the drawing. In the illustrated embodiment these air pipes are below the lines of cassettes going lengthwise through the cell or system. One pipe 50 is shown below each membrane unit 22, but one common air pipe could be provided for the pair. In another embodiment a main air pipe could be located in the recycle wall 28, which is a compact, elongated space, and fed to diffusers under the units 22. The permeate pipe 32 could also be in the recycle wall if desired. The IR in this embodiment circulates, but not in the typical circular, two-sided roll pattern of the prior art as shown in FIG. 1. Due to the constraints of the tank volume 44 around the membrane cassettes 22, and provision of appropriate ducting, baffles, piping or simply a clear channel of space, the IR moving as slug flow upward between the membranes circulates through a series of openings 56 that act essentially as a continuous recycle opening, down through IR pipes, channels or space 58 preferably provided in the recycle wall, and out through IR ports 60 to circulate back beneath the membrane assemblies or units 22. In the embodiment shown in FIG. 4 the return flow channel 42 is separated from the IR inlet and channel 56. These flows can optionally be combined, however, as shown and described below. FIG. 4 shows a sludge feed pipe 62 running lengthwise under each line of membrane assemblies or units 22. Those pipes 62 feed MLSS (or input wastewater) to the line of units 22 via holes which can be graduated in size in order to substantially balance flow rate of the sludge to all units 22 along the line.

The integration of the return zone 40 and the IR 56 into one structure in the tank can eliminate the need for additional concrete walls, which can reduce costs and improve on installation times. The combined structure can also be used to support covers for the tanks as seen further below.

FIGS. 10 and 11 show examples of a structure that can serve as the IR and return collection troughs and provide channels for the IR circulation. In FIG. 10 this structure can include a trough 65 with a multiplicity of openings 42, 56 in the sides, facing into the liquid volume within the tank. In this form of the collector structure a generally horizontal plate 66 divides the flows between a lower trough level 41 for IR and an upper trough level 40 for the return zone, the overflow that is removed from the MBR. The return zone and openings 42 establish the level 33 of the liquid within the tank volume 44. Thus, the IR flows into the lower level 41 through the openings 56, and then down through vertical pipes or conduits 68 and through discharge ports 70 at bottom, where the internal recycle is delivered back to the space beneath the submerged membrane assemblies or units. The return sludge being carried out of the tanks through the openings 42, on the other hand, is conveyed through the upper trough or channel 40 to a point or points down the line where the liquid flows, preferably by gravity, away from the trough. The illustrated structure can serve as a support for tank covers over the tanks, as shown substantially in FIG. 5B discussed below.

FIG. 11 shows an alternative flow arrangement in which the trough structure 72 is without a plate to establish upper and lower flow channels. Here, the IR enters the single trough 74 as both IR and return, through openings 56 such as shown in FIG. 10. As in FIG. 10, the IR portion of flow travels down pipes 68 (FIG. 10) or down large channels 76 shown in FIG. 11 to be circulated back into the tank volume below the membrane assemblies. The trough 74 also establishes a level for the liquid in the liquid volume 44 of the tank, by, at some distant point down the trough, flowing by gravity over a weir or into a pipe or series of pipes at a certain level.

Figure 4A:
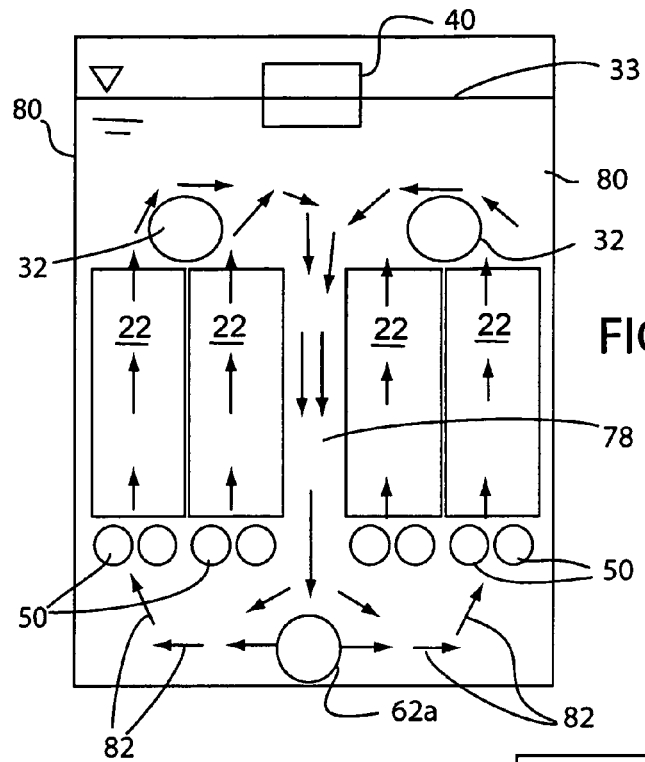
FIG. 4A is a view like FIG. 4 but with a modification.

FIG. 4A shows, in schematic elevation similar to FIG. 4, an alternative to the FIG. 4 structure. In FIG. 4A there is no specific recycle wall, but instead a space or compartment or channel 78 left between the membrane assemblies 22 on the left and those on the right. Within each pair the units or assemblies 22 are very close together, but the space 78 is wide enough to establish the IR circulation pattern, with no IR down pipes. The return zone 40 can be supported at intervals by structural posts (not shown) or by structure (not shown) connected to the tank walls 80. Here the IR occurs without the need for down pipes but through a clearly defined channel or compartment 78. Arrows 46 illustrate the approximate IR flow circulation pattern. Return is segregated from IR, flowing into the return zone 40.

Another important difference in FIG. 4A is in regard to infeed. It should be understood that this infeed variation applies equally to the system shown in FIG. 4. Here, an infeed pipe 62a is positioned below the membrane units or assemblies 22 as shown, and a single infeed pipe 62a can be used for the four lines of units 22 indicated. The infeed pipe carries MLSS or influent flow and can run for an extended distance lengthwise through the tank or through a plurality of zones or cells. To accomplish a substantial balance of the feed to all units down the line, the infeed pipe 62a can have discharge holes of graduated size, with the largest holes being most distant from the source feeding the pipe. Arrows 82 show the approximate flow pattern from the pipe 62 to the filtration units.

In FIG. 4A aeration pipes are shown at 50 and permeate pipes, fed from permeate lines connected to each unit 22 (as further detailed below) are shown at 32 above the filtration units. The aeration can be via holes in the pipes 50. If desired these pipes could be provided one per line of units 22, as in FIG. 4, rather than two per line as shown in FIG. 4A.

Figure 4B:
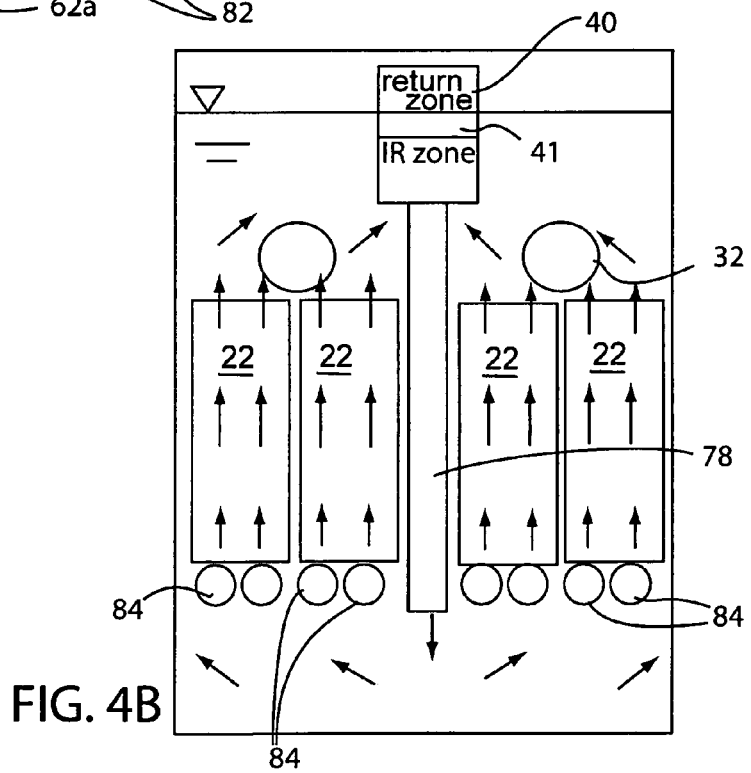
FIG. 4B is another sectional view like FIG. 4, with another modification.

FIG. 4B shows another variation of FIG. 4, with a dual-phase flow of air and infeed sludge to the tank volume, beneath the submerged membrane assemblies. One or more infeed pipes 84 can be positioned beneath each line of membrane assemblies 22, extending lengthwise through the long dimension of the tank or series of zones or cells. These pipes carry both pressurized air and infeed mixed liquor; the air is not actually delivered through diffusers but through holes in the pipes 84 of appropriate size so as to deliver the multi-phase flow. For multi-phase pipes of considerable length, as noted above these pipes can be provided with discharge holes that vary in size so as to balance the delivery of the pressurized flow along the length of the pipes. The holes become much larger and larger down the line away from the source, so as to deliver the flow evenly for a sludge/air flow of a target consistency and air content. Note that with four pipes 84 at each side as shown, or even with only two pipes at each side, pressure can be used to substantially balance the flow down the length of an elongated tank. One pipe can have openings near the source, while the other has openings more remote from the source, and by adjusting pressure between the two pipes a generally even distribution can be achieved. Equal delivery of infeed and equal return (through return and IR) avoids limits in tank design or aspect ratio by eliminating gradients. Flow is generally uniform regardless of tank length, an important feature of this invention.

The dual-phase flow through the pipes 84, with air being emitted from much larger holes than in the case of diffusers, provides for much easier maintenance than diffusers.

Figure 5A:
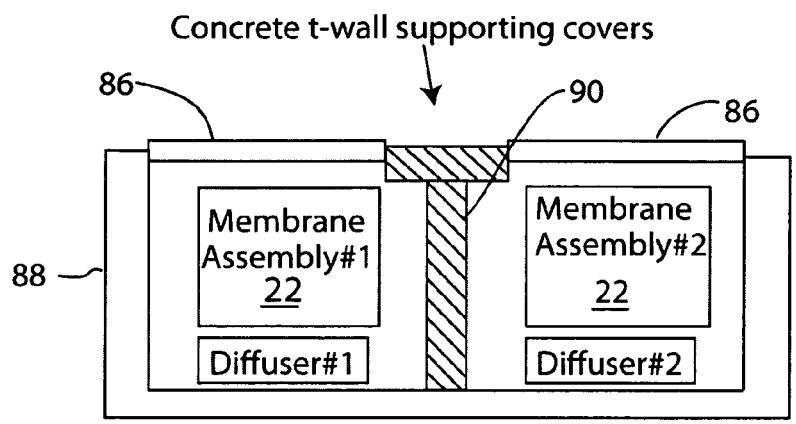
FIGS. 5A and 5B are further schematic sectional views of tanks, with FIG. 5A showing prior art for supporting tank covers, and FIG. 5B showing an arrangement with the wall between membrane assemblies serving as a structural support for tank covers.
Figure 5B:
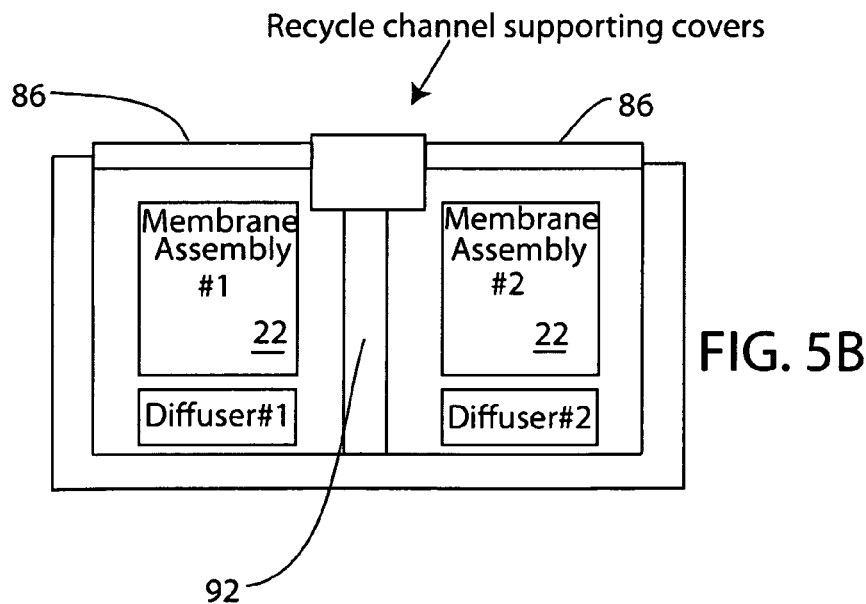

FIGS. 5A and 5B demonstrate support of tank covers 86. In the prior art view of FIG. 5A a tank 88 is shown, typically of concrete, with membrane assemblies 22 positioned in each of two sides (these membrane assemblies are shown turned to the transverse orientation such as shown in FIG. 3A). A structural support 90 is shown, such as of concrete, for supporting the tank covers 86 along with the outer walls of the tank. FIG. 5B, however, shows schematically the invention and how a recycle channel or wall 92 can support the tank covers 86. The need for additional concrete (or other structural material) to support the inner sides of the tank covers 86 is eliminated. The recycle wall or compartment 92 can be similar to the structure 28 indicated schematically in FIG. 4 or similar to the trough and pipe IR structure shown at 65, 68 in FIG. 10 or the trough and vertical channel structure shown at 72, 76 in FIG. 11. Again, in FIG. 5B the membrane assemblies 22 are shown in transverse orientation, which can be similar what is shown in FIGS. 3C and 3D, although with membrane filtration assemblies at both left and right of a central recycle compartment or wall 92. FIG. 5B shows that the IR structure of the invention can serve the dual purpose of conducting IR and return sludge as well as serving as an important structural support.

Figure 6:
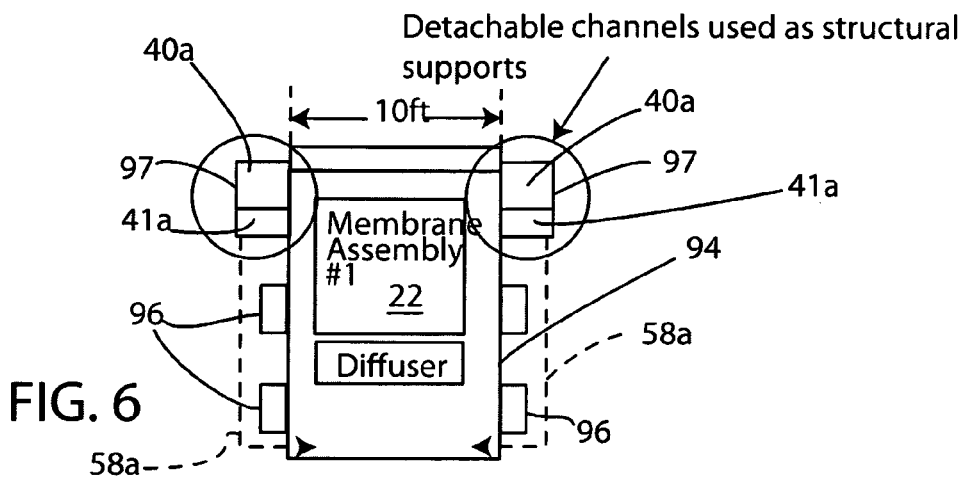
FIG. 6 is another elevational sectional view with a modification wherein a horizontal structural tank component serves as a recycle conduit.

FIG. 6 shows another aspect of the invention, in which membrane units or assemblies 22 are installed in non-concrete tanks, such as the steel tank as shown at 94. Typically these steel tanks include horizontal bracing such as schematically shown at 96. In the invention an upper steel reinforcement is replaced at one or both sides by an elongated structural and water-carrying channel member 97 that serves the same structural reinforcing purpose and also provides channels for return and IR. See return zones 40a and IR zones 41a. Holes are drilled (not shown) through the steel tank wall to these zones. IR pipes are shown in dashed lines at 58a; if the IR zones are at both sides, one or both can serve adjacent tanks. An air diffuser 98 is shown below the membrane assembly 22.

Figure 7:
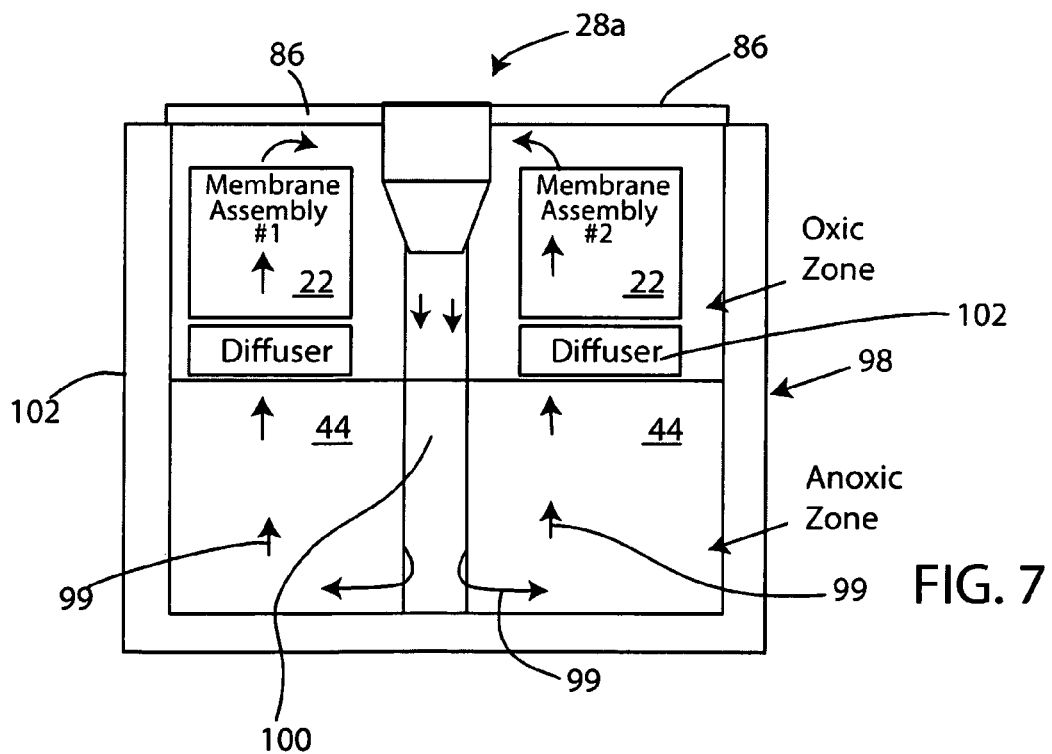
FIG. 7 is another elevational sectional view, here showing side-by-side MBR tanks with a structural recycle wall between them and with an extended depth for supporting a process.

FIG. 7 shows schematically an arrangement for a membrane system of the invention wherein another process is supported. That process is the maintenance of simultaneous nitrification and denitrification in the same tank or zone, as described in, for example, U.S. Pat. Nos. 6,743,362 and 6,712,970. In FIG. 7 side-by-side banks of submerged membrane assemblies 22 are served by a common recycle wall or chamber 28a between them. The banks of membranes are contained in separate tank volumes 44, one at either side of the IR chamber or wall space 28a. As illustrated, the IR wall structure 28a acts as structural support for tank covers 86. The two tank volumes 44, in the example shown, are formed by a single tank structure 98. Permeate exit pipes, and air supply pipes and infeed pipes are not shown in FIG. 7 but can be as shown in FIGS. 4 to 4B and discussed above, or some of these pipes could be in the recycle wall if desired.

This is a deep tank, shown with the membrane assemblies 22 supported at an elevated position (by appropriate structure). Internal recycle is indicated by arrows 99 and occurs in much the same way as described above. The IR flows in a circulating pattern, preferably down through the wall via a vertical channel space 100 (which can be through pipes or simply an open channel as described above) ducted to return to the bottom of the tank volume 44 as indicated by the arrows. There, the activated sludge is maintained in an anoxic state, but the flow pattern causes the sludge to migrate upwardly, to where it is aerated by air bubbles released at 102, where slug flow is induced to create the circulation pattern. Return can be discharged from the MBR using a trough or catch basin or channel such as the channel 40 shown in FIG. 4. The same process occurs on both sides of the system.

Figure 8:
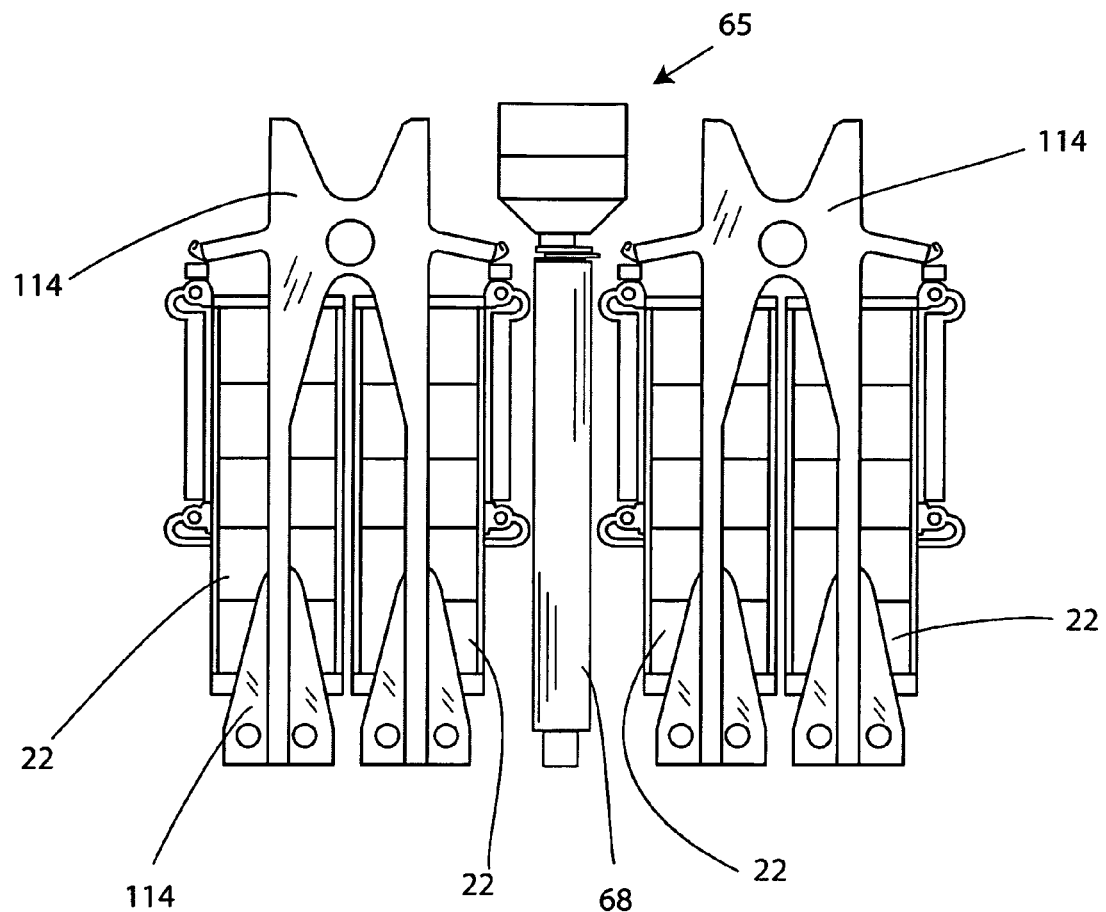
FIG. 8 is a transverse elevation view showing a system with side-by-side membrane units and a recycle wall of space between units.
Figure 9:
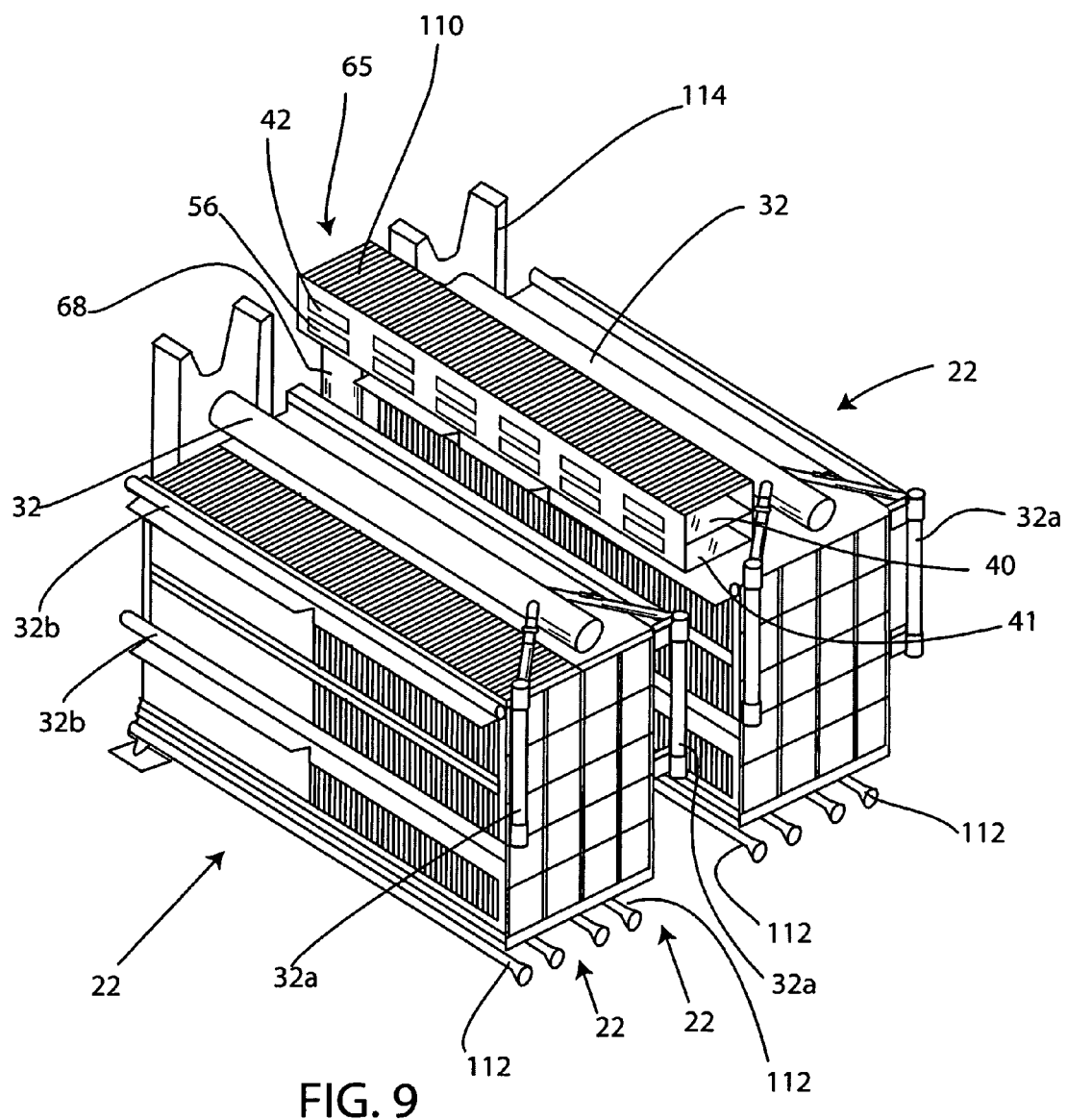
FIG. 9 is a perspective view showing a side-by-side MBR tank layout as in FIG. 8, with a center structure having recycle elements generally as in FIG. 4.

FIGS. 8 and 9 show, in elevational end view and in perspective view, a schematic of side-by-side banks of cassettes or assemblies 22 in a system which may be generally similar to that illustrated in FIG. 4, with IR wall structure 65, 68 such as shown in FIG. 10, between the two banks of cassettes. The actual partition walls, if present, are not shown in this schematic, nor is the tank that surrounds these structures (as in FIG. 4A there may be no wall at the recycle compartment or space). As FIG. 9 illustrates, the IR structure 65, 68 comprises a trough structure that in this embodiment is separated into upper and lower channels by the plate 66 as in FIG. 10. A cover 110 is shown for the trough structure. Inlets for IR are shown at 56 and for return are shown at 42. The IR pipes 68 are also visible, for conducting the IR down to the bottom of the tank for circulation under the banks of cassettes (the down channels 76 could alternately be used). The units 22 are shown on each side of the IR structure 65, 68, with the two cassettes closely positioned side by side, virtually in contact.

FIG. 9 also shows much of the equipment and piping for permeate, ML and air. Permeate pipes are shown at 32, above the banks of cassettes at either side as shown in FIG. 4. They are fed by smaller permeate withdrawal pipes 32a from each cassette, as shown. In turn these pipes 32*a* collect permeate from smaller permeate lines 32*b* provided on one side of each assembly 22, receiving permeate from each membrane of the assembly. Pipes 112 below the banks of cassettes are for delivery of scour air, or more preferably they are multi-phase air/ML pipes as in FIG. 4B. Two multi-phase pipes can be provided per line of units 22, which may be arranged in a long gallery.

The structure 65, 68 (or 72, 76) preferably supports tank covers, as discussed above. End frames 114, also seen in FIG. 8, support the permeate pipes 32 and can also help support tank covers.

Figure 12:
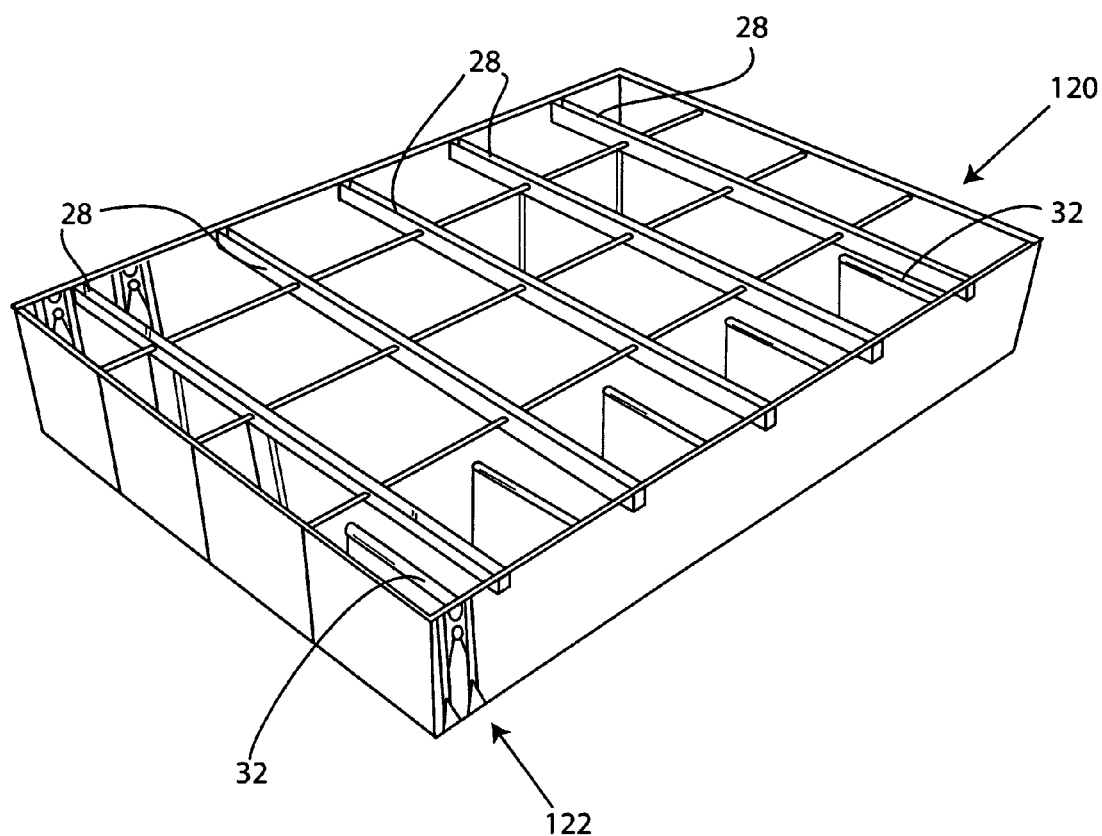
FIG. 12 is a schematic perspective view showing an array of process cells each with a series of membrane units in accordance with the invention.

FIG. 12 is a perspective view schematically illustrating a matrix of process cells for an MBR system of the invention. A cell is represented by the equipment shown in FIG. 9, the permeate pipe 32 of which is seen for a row of the cells in FIG. 12. In FIG. 12 five recycle walls or compartments 28 are shown, as an example. A process cell as defined herein holds four of the membrane cassettes or units or assemblies 22, one on either side of the recycle wall or space 28. Thus, the row indicated at 120 in FIG. 12 has five process cells. Since there is no wall between adjacent process cells within the row 120, the membrane separation assemblies 22 of one process cell should be closely adjacent to one of the membrane assemblies 22 of the next process cell down the row. Space for IR is provided only at the recycle wall or compartment or space 28 in each cell.

FIG. 12 shows an array of twenty process cells, five cells in each of four rows. Permeate pipes, infeed pipes, air pipes or multi-phase air/infeed pipes are continuous from cell to cell, row to row in the array of FIG. 12. In other words, they are continuous in the direction lower right to upper left in FIG. 12. The array can be considerably larger if desired.

Figures 13A, 13B:
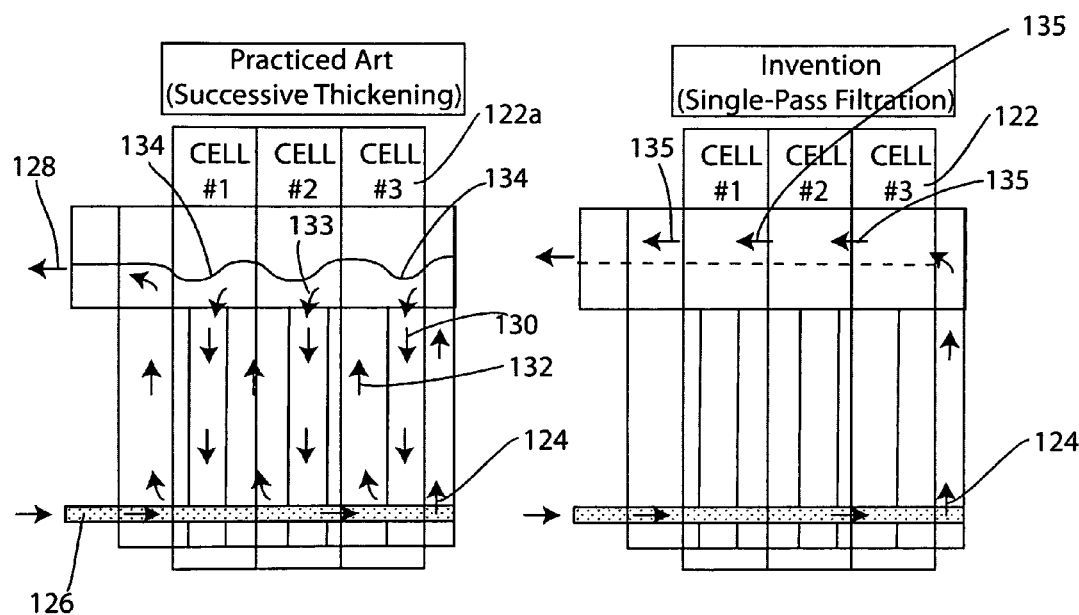
FIGS. 13A and 13B are schematic sectional elevation views indicating a prior art sludge thickening pattern (FIG. 13A) and sludge thickening with the invention (FIG. 13B).

FIGS. 13A and 13B are schematic diagrams, as sectional elevational views, indicating a prior art sludge thickening pattern and sludge thickening according to the invention. These schematics indicate only what occurs with infeed sludge delivered to the last cell in a bank of treatment cells. Three cells 122*a* are shown in FIG. 13A (the cells being shown only as blocks). There may be considerably more than three in a series. Note that sludge delivered to cell number 1 and cell number 2 in FIG. 13A is not considered here, only sludge at 124 that emerges from the end of an infeed pipe 126. That sludge will inevitably make multiple passes through the cells, because return is shown at 128, at one end of the series of cells, rather than continuous withdrawal of return. The arrows 130, 132, 133, etc. show that sludge discharged at the end of the line of cells will be treated in stages because of the single sludge return location at 28, at one end of the series of cells. The drawing schematically shows hydraulic surges at 134 where IR circulation draws down additional ML that should be returned out of the tank. Because of this staged treatment of sludge from one end of the bank of cells, each cell will be treated progressively less thoroughly, toward the direction of the first cell on the left.

However, FIG. 13B demonstrates that the system of the invention does not exhibit this problem. Again considering only sludge delivered at the end of a bank of cells, at 124, this sludge is treated in the end cell 122 (cell number 3 in the diagram) and is then discharged into a trough such as explained above. The sludge does not progress back through the other cells through a single exit point as in FIG. 13A, but is discharged at multiple individual exit areas for each cell, as noted at the arrows 135. The return from each cell can comprise essentially an infinite return area or trough. The invention essentially achieves stepped sludge discharge along the array of cells and stepped return along the array of cells, achieving essentially equal discharge and essentially equal return from each cell. This feature enables the invention to be scalable to virtually any desired aspect ratio in an array of process cells, not limited by problems with uneven distribution and return.

Figure 14:
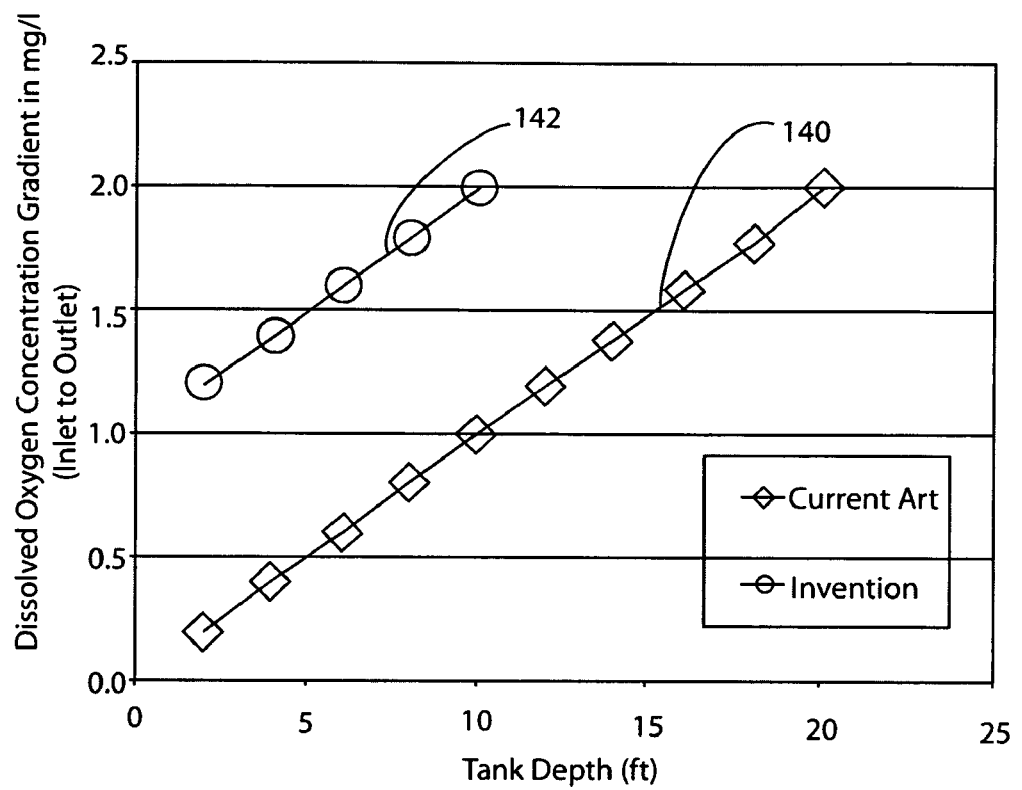
FIG. 14 is a graph showing dissolved oxygen concentration gradients with tank depth.
Figure 15:
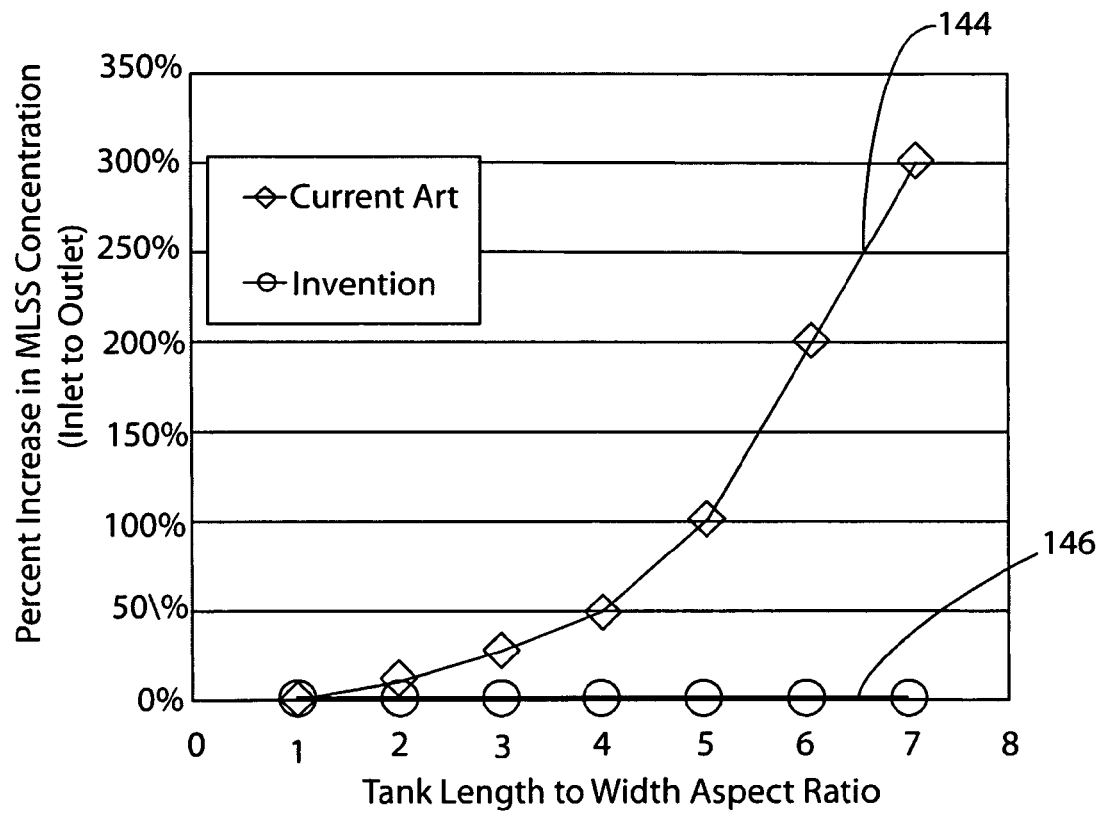
FIG. 15 is a graph showing MLSS concentration variation compound against tank length/width ratio.

FIG. 14 is a graph that shows approximately the relationship of tank depth for an MBR reactor to the dissolved oxygen concentration. Tank depth is shown in feet and oxygen concentration is shown in milligrams per liter. The gradient lines are shown at 140 for prior systems and 142 for the invention. The graph illustrates that with the invention the gradient is much shorter, with dissolved oxygen variation much less. FIG. 15 is another graph, in this case showing approximate percent increase in MLSS concentration from inlet to outlet, against a range of different aspect ratios from 1 to 7. Prior systems are indicated in the plot line 144, while the invention is illustrated by the line 146. This demonstrates that with the invention tank length to width aspect ratio can be very large, and, because of the invention's essentially equal distribution of sludge and essentially equal return from all cells, there is virtually no increase in MLSS concentration from one end to the other of an elongated tank. In contrast, prior systems can exhibit about 300% increase in sludge concentration near the outlet end, as compared to the opposite end, for the reasons explained above relative to FIG. 13A.

Figure 16:
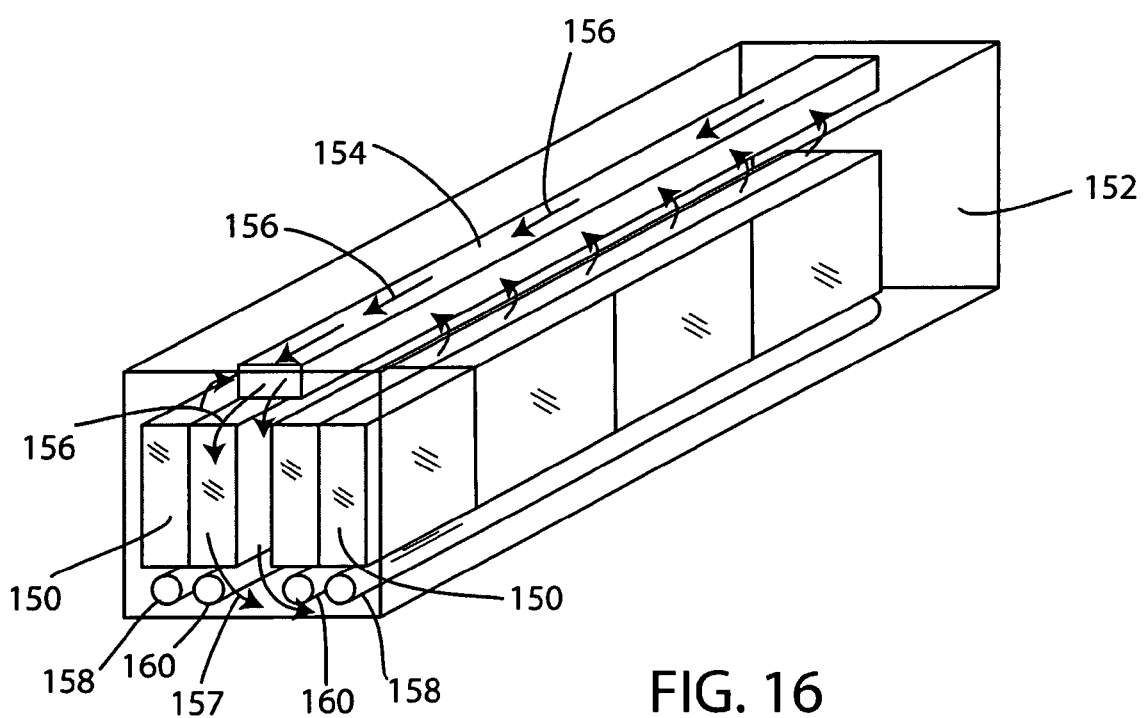
FIG. 16 is a schematic view in perspective showing an alternative to some of the membrane separator arrangements shown in the drawings above.
Figure 17:
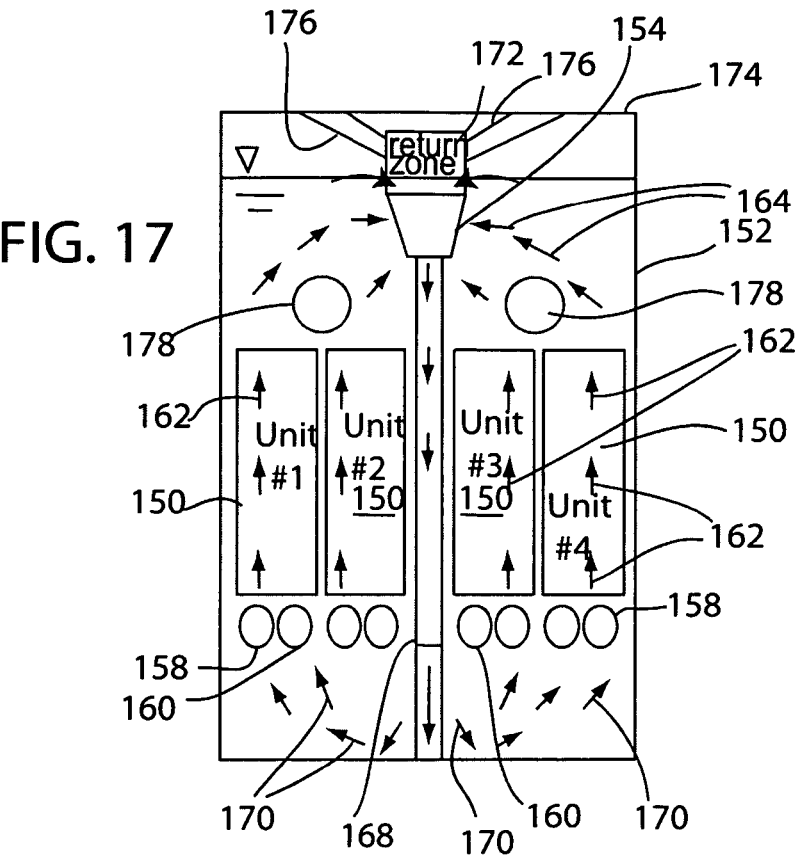
FIG. 17 is a schematic cross section view of a system such as in FIG. 16.
Figure 18:
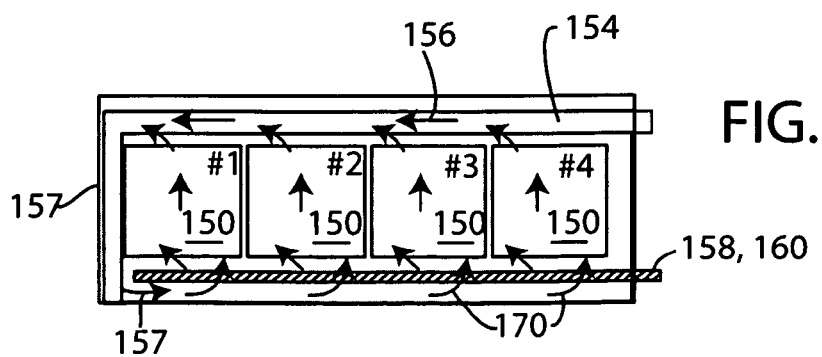
FIG. 18 is side elevation or cross section view showing a system such as in FIG. 16.

FIGS. 16, 17 and 18 demonstrate that the space-efficient and process-efficient arrangement of the invention can be configured otherwise than in the arrangements discussed above and shown in FIGS. 3C through 9. As shown schematically in FIG. 4A, the internal recycle path need not be directed by pipes or channels conveying the recycle mixed liquor downwardly to below the membrane assemblies of membrane separators. FIGS. 16-18 schematically illustrate that the flow need not be down through a central space as in the arrangements of FIGS. 4, 4A, 4B, and FIGS. 8 and 9. The flow can actually be around the ends of a group of many membrane separators, or around the ends of a banked array of membrane assemblies. In FIG. 16, groups of membrane separators are shown at 150. These can be cassettes or simply assemblies or groups of individual membrane separators. The membrane separators can actually be placed in the tank 152 in an orderly, closely spaced arrangement without cassettes or units, but in an essentially continuous array, subject to the need to lift out and clean groups of membrane separators. For this purpose the membrane separators can be in groups that are held together in a track or framework that keeps them at the proper spacing and provides a framework for lifting them out for cleaning. Other than this limitation, groups of membrane separators can be closely spaced together, virtually as closely as the separators themselves are spaced, so that the separators are in an essentially continuous array throughout the tank. FIG. 16 schematically illustrates that internal recycle can be from above the membrane separators to an IR channel 154 above the array of separators, and from this channel the IR can be distributed, as shown by the arrows 156, to an end of the tank 152, or an end of a defined group or set of groups of membrane separators, to recirculate back down, as at arrows 157, to the space below the array of separators, where air scour and infeed pipes 158, 160 (or multi-phase air/infeed delivered from these pipes) induces the upward flow through the membranes. Return mixed liquor preferably also flows into the channel or conduit structure 154. This can be into an upper level defined by a horizontal dividing plate (not shown), to conduct the return ML out an end of the structure 154, or the IR and return flows can be combined, with a portion conducted away at an end as controlled by an overflow level. Note that flow of IR and/or return could be to both ends of the structure 154, i.e. both ends of the elongated tank, if desired.

FIG. 17 is a cross sectional view through a tank and membrane separator array such as shown in FIG. 16. In this cross section the membrane separators are shown in groups or units 150, which merely represent groups of separators but not necessarily any physical unitizing structure for each group. Infeed pipes 158 and air scour pipes 150 are shown below the groups of separators, or these can be multi-phase pipes as discussed above. Slug flow movement is induced by the rising air bubbles, carrying sludge up to and between the membrane separators, the slug flow movement being indicated by arrows at 162. The flow rises above the groups of separators as shown at arrows 164, to an IR zone 154 which is continuous throughout the length of the tank 152 and which provides for downflow as an IR column (with or without a pipe or conduit), at 168. The IR flows back to the bottom of the groups of separators as indicated by arrows 170. This downflow of IR can be at an end of the tank as shown in FIG. 16, or at both ends of an elongated tank, or at various spaced positions along the length of tank having a very high aspect ratio of length to width. As noted above, a dedicated channel or structure 168 is not necessarily provided, but is shown schematically in FIG. 17. The IR downflow at a minimum requires an essentially unencumbered space for this flow, and the flow will occur in a discrete flow path without any such downflow channel or pipe 168. If desired the end or ends of the IR channel 154 (see FIGS. 16 and 17) can be continued in a pipe or channel that actually exits the tank and re-enters at the space below the membrane separators.

FIG. 17 shows a return zone 172 for return sludge to exit the tank, and this can be structured generally as shown in the earlier drawings, with a single trough structure being preferably divided into a return zone 172 and the IR zone 154. FIG. 17 also indicates that the channel structure 154 or combined structure 154, 172 can be supported by a tank cover 174, and suspending brackets or connectors are shown at 176. The IR zone channel or the return zone channel could be an integral part of a tank cover. Alternatively, a membrane assembly frame (not shown—for holding membrane separators in an orderly, evenly spaced array) can support the overhead trough or channel.

Permeate withdrawal pipes are schematically indicated at 178.

FIG. 18 schematically shows a system as in FIGS. 16 and 17 in side elevation or section view. The horizontal IR flow is shown at 154, with the downward IR return movement to the area beneath the separators shown at 157 and 170. Return ML flow is not indicated in this schematic view.

The system of the invention, in the different embodiments described, avoids successive thickening of sludge from one membrane assembly to another, i.e. successive thickening down the length of the tank. This is a problem with prior systems, as explained above with reference to FIGS. 13A and 13B, due to uneven withdrawal of return mixed liquor. When ML destined to exit the tank as return is able to find an easier flow path in the prior systems, it will undergo successive thickening, moving through different groups or assemblies of membrane separators before it ultimately exits the tank as return. As discussed above, the invention avoids this by achieving generally uniform removal of return through overflow outlets. Also, short circuiting of biological processes is prevented by generally uniform infeed of sludge through the length of the tank. With these two features ML does not progress down the length of the tank as it is processed; the system acts as a number of cells in parallel, avoiding series treatment within the zone. This is an important feature and contributes significantly to the efficiency of the system of the invention. A corollary of this, or a result, is that in accordance with the invention at least about 95% of all mixed liquor in the tank has a hydraulic retention time of no more than one hour. In prior systems HRT could be up to four hours.

Herein and in the claims the distribution of infeed to a tank of the system, and also the outflow of return mixed liquor, are characterized as generally uniform throughout all the membrane separator assemblies or groups of membrane separators in the tank, even a very elongated tank. The term "generally uniform" is intended to mean that withdrawal rate at any one point or outlet is no more than 25% greater than withdrawal rate at any other point or outlet; more preferably the withdrawal rate varies no more than 10%, and most preferably no more than 5%. The same is intended for generally uniform infeed.

Also in the claims, reference is made to air delivery systems or scour air emitters or scour air bubbles. This is not intended to be limited only to air, but also includes use of oxygen or ozone or either of these mixed with air or other gases.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In a wastewater or biosolids treatment system using submerged membrane bioreactors and containing a multiplicity of flat sheet membrane separators retained in membrane filtration units or assemblies within a tank, an improved, space-efficient and process-efficient arrangement, comprising:

a series of air discharge conduits located below the membrane separators for emitting scour air bubbles to rise among the membrane separators for air scouring and effective to lift mixed liquor in the tank among the membrane separators to rise with the air bubbles, a multiplicity of flat sheet membrane separators arranged in a plurality of groups or membrane filtration units, with a plurality of the units positioned side by side within an SMBR tank and submerged in liquid within the tank, the membrane filtration units being arranged and contained in the tank closely together so as to prevent normal roll pattern internal recirculation around individual membrane filtration units and to define for the mixed liquor moving upward with scour air bubbles between the membrane separators a discrete flow path or channel leading from space above the membrane separators around a plurality of the membrane filter assemblies to below the membrane separators to deliver the recirculating mixed liquor generally back to the air discharge conduits below the membrane separators to again induce upward movement of the mixed liquor among the membrane separators with the rising scour air bubbles, at least one submerged infeed conduit below the membrane separators with discharge outlets configured to distribute infeed generally uniformly to the membrane separators, and at least one overflow outlet above the membrane separators, to remove, generally uniformly from all membrane filtration units, mixed liquor from the SMBR tank as return to other process zones, substantially preventing successive thickening of return mixed liquor to generally maintain a liquid level in the tank.

2. A system according to claim 1, wherein the discrete flow path or channel comprises a space to one side of a group of membrane separators.

3. A system according to claim 1, wherein the discrete flow path or channel comprises a space directly above a group of membrane separators.

4. A system according to claim 1, wherein the tank is elongated, with a length much greater than its width, and wherein the membrane filter assemblies each have a long dimension which extends along the width of the tank in a transverse direction.

5. The system of claim 1, wherein the tank is elongated, with a length much greater than its width, and wherein the membrane filtration units each have a long dimension which extends parallel to the length of the tank in a longitudinal direction.

6. A system according to claim 1, wherein the air discharge conduits are combined with the submerged infeed conduit, with air and mixed liquor delivered in multi-phase flow.

7. A system according to claim 1, wherein the overflow outlet for return mixed liquor is positioned above the membrane filtration units and establishes a common flow with the internal recirculating mixed liquor in said discrete flow path or channel.

8. A system according to claim 1, wherein said overflow outlet is separate from said discrete flow path or channel.

9. A system according to claim 1, wherein the tank includes a wall or compartment extending through the length of the tank and positioned alongside the groups or membrane filter assemblies, the wall or compartment having vertical channels arranged as columns forming a part of said discrete flow path or channel, and the tank having covers supported at least in part by the columns.

10. A system according to claim 1, wherein the tank includes a generally horizontal channel or conduit extending through the length of the tank and positioned above the groups or membrane filtration units, a generally horizontal channel or conduit forming a part of said discrete flow path or channel, and the tank having one or more covers, the covers supporting the generally horizontal channel or conduit.

11. A system according to claim 10, wherein the generally horizontal channel or conduit is an integral part of the tank cover or covers.

12. A system according to claim 10, wherein the tank is elongated, with a length much greater than its width, and when the generally horizontal channel or conduit above the membrane filtration units delivers internally recirculated mixed liquor at least at one end of the elongated tank at the end of the groups or membrane filter filtration units to descend down to below the groups or membrane filtration units for recirculating back to the air discharge conduits below the membrane separators.

13. A system according to claim 1, wherein at least 95% of all mixed liquor in the tank is limited to a hydraulic residence time in the tank of one hour or less.

14. In a wastewater treatment system having a liquid side including an MBR zone containing a multiplicity of flat plate membrane separators retained in membrane cassettes, an improved, space-efficient arrangement of cassettes, comprising:

a series of membrane cassettes positioned side by side and closely together within an MBR tank,
a series of scour air emitters below the cassettes, for emitting scour air bubbles to rise among the membrane separators for air scouring,
an inlet for mixed liquor inflow to the MBR tank,
an elongated side compartment adjacent to and at one side of the series of cassettes, the side compartment defining one or more internal recycle flow channels open to the mixed liquor in the tank and positioned to receive a stream of recirculating mixed liquor rising with air scour bubbles from between the membranes in a plurality of the cassettes, and the side compartment having said flow channels positioned to direct the stream of recirculating mixed liquor down to lower ends of the cassettes to deliver the stream of recirculating mixed liquor to mix with scour air below the cassettes, and
the side compartment further including at least one overflow outlet above the membranes, to remove mixed liquor from the MBR tank as return to generally maintain a liquid level in the tank, with a return conduit to carry the overflow return away from the tank,
whereby the cassettes are packed closely together in the tank, with one or more internal recycle flow channels each conducting internal recycle from a plurality of cassettes, providing space and process efficiency.

15. The system of claim 14, wherein the overflow outlet is connected to the internal recycle flow channel, so that a portion of mixed liquor entering the internal recycle flow channel flows out through the overflow outlet as return.

16. The system of claim 14, wherein the at least one overflow outlet comprises a series of overflow outlets in the side compartment positioned above the level of the at least one internal recycle flow channel.

17. The system of claim 14, including a cover over the MBR tank, and wherein the internal recycle flow channel or channels include substantially vertical pipes for directing the recirculating mixed liquor down to the lower ends of the cassettes in the tank, and further including a trough at top ends of the pipes and supported by the pipes, the trough receiving mixed liquor as part of the internal recycle flow channel, and the pipes and trough serving as structural supports for the cover over the MBR tank.

18. The system of claim 14, wherein the MBR tank is elongated, with a length much greater than its width, and wherein the membrane cassettes each have a long dimension which extends across the width of the MBR tank.

19. The system of claim 14, wherein the MBR tank is elongated, with a length much greater than its width, and wherein the membrane cassettes each have a long dimension which extends parallel to the length of the tank.

20. The system of claim 14, wherein said inlet for mixed liquor inflow comprises a multi-phase infeed pipe carrying mixed liquor and scour air, the infeed pipe having a series of discharge holes serving as said scour air emitters, emitting mixed liquor along with scour air bubbles.

21. The system of claim 14, wherein said inlet for mixed liquor comprises a submerged infeed conduit, at least one submerged infeed conduit below the membrane separators with discharge outlets configured to distribute infeed generally uniformly to the membrane separators.

22. The system of claim 14, wherein the side by side membrane cassettes are positioned with less than about two inches clearance between cassettes.

23. In a wastewater treatment system having a liquid side including an MBR zone containing a multiplicity of flat plate membrane separators retained in membrane cassettes, an improved, space-efficient arrangement of cassettes, comprising:

a series of membrane cassettes positioned side by side and closely together within an MBR tank so as to prevent normal roll pattern internal recirculation around individual cassettes, the tank being elongated with a length greater than a width of the tank, at least one mixed liquor delivery pipe extending lengthwise in the tank below the cassettes and carrying air along with incoming mixed liquor, the pipe having a series of discharge holes, for emitting air bubbles along with the mixed liquor to rise among the membrane separators for air scouring, an elongated side compartment adjacent to and at one side of the series of cassettes, the side compartment having one or more internal recycle flow channels with mixed liquor intakes open to the mixed liquor in the tank above the membrane separators and positioned to receive a stream of recirculating mixed liquor rising with air scour bubbles from between the membranes and above the cassettes, and the side compartment having said flow channels positioned to direct the stream of recirculating mixed liquor down to positions near lower ends of the cassettes to deliver the stream of recirculating mixed liquor to mix below the cassettes with scouring air and incoming mixed liquor from the delivery pipe, and the side compartment including at least one overflow outlet above the membranes, to remove mixed liquor from the MBR tank as return to generally maintain a liquid level in the tank, with a return conduit to carry the overflow return away from the tank, whereby the cassettes are packed closely together in the tank, providing space efficiency.

24. The system of claim 23, including a cover over the MBR tank, and wherein the internal recycle flow channels include substantially vertical pipes for directing the recirculating mixed liquor down to the internal recycle inlets to the tank, and further including a trough at top ends of the pipes and supported by the pipes, the trough receiving mixed liquor as part of the internal recycle flow channel, and the pipes and trough serving as structural supports for the cover over the MBR tank.

25. The system of claim 23, wherein the membrane cassettes each have a long dimension which extends parallel to the length of the tank.

26. In a wastewater treatment system having a liquid side including an MBR zone containing a multiplicity of flat plate membrane separators retained in membrane cassettes, an improved, space-efficient arrangement of cassettes, comprising:

a series of membrane cassettes positioned closely together within an MBR tank, the cassettes being arranged without sufficient space around each cassette to establish an air-bubble induced integrated recycle roll pattern around both sides of a single cassette, the cassettes being arranged to cause a common recirculating IR pattern to occur from a plurality of the cassettes together, at least one conduit below the cassettes emitting air bubbles to rise among the membrane separators for air scouring and for inducing upward flow of mixed liquor between and along the membrane separators, an inlet for mixed liquor inflow to the MBR tank, an elongated side space within the tank, adjacent to and at only one side of the series of cassettes, the side space defining a flow path for internal recycle recirculation of mixed liquor from above the cassettes over to said one side and down through the space at said one side to below the cassettes, where the recycle flow again is induced upwardly by air bubbles released beneath the cassettes, at least one overflow outlet at said one side of the cassettes, positioned to establish a liquid level in the tank and to remove the mixed liquor from the MBR tank as return, and a permeate withdrawal pipe running parallel to the length of the series of cassettes, the permeate withdraw pipe being connected to each of the cassettes to withdraw permeate liquid from the individual membrane separators, whereby the cassettes are packed closely together in the tank, and recycle and return can be located at one side of the tank, providing space efficiency.

27. The system of claim 26, wherein a wall or baffle partitions the cassettes from the side space to help direct internal recycle recirculation.

28. The system of claim 26, wherein said inlet for mixed liquor comprises at least one submerged infeed conduit below the membrane separators with discharge outlets configured to distribute infeed generally uniformly to the membrane separators.

* * * * *